(12) United States Patent
Banerjee et al.

(10) Patent No.: US 12,288,401 B2
(45) Date of Patent: Apr. 29, 2025

(54) ANOMALOUS ACTIVITY DETECTION FOR MOBILE SURVEILLANCE ROBOTS

(71) Applicant: Tata Consultancy Services Limited, Mumbai (IN)

(72) Inventors: Snehasis Banerjee, Kolkata (IN); Balamuralidhar Purushothaman, Bangalore (IN); Mritunjoy Halder, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 105 days.

(21) Appl. No.: 18/473,595

(22) Filed: Sep. 25, 2023

(65) Prior Publication Data

US 2024/0177488 A1 May 30, 2024

(30) Foreign Application Priority Data

Nov. 25, 2022 (IN) .............................. 202221068018

(51) Int. Cl.
*G06V 20/52* (2022.01)
*G06V 10/25* (2022.01)
(Continued)

(52) U.S. Cl.
CPC .............. *G06V 20/52* (2022.01); *G06V 10/25* (2022.01); *G06V 10/751* (2022.01); *G06V 10/82* (2022.01);
(Continued)

(58) Field of Classification Search
CPC ........ G06V 20/52; G06V 10/25; G06V 20/46; G06V 10/82; G06V 10/751; G06V 40/20; G06V 20/56
See application file for complete search history.

(56) References Cited

U.S. PATENT DOCUMENTS

2023/0379347 A1* 11/2023 Rama .................. H04L 63/1416

OTHER PUBLICATIONS

Muhammad Zaigham Zaheer et al, "An Anomaly Detection System via Moving Surveillance Robots with Human Collaboration," 2021 IEEE/CVF International Conference on Computer Vision Workshops (ICCVW), Oct. 11-17, 2021, IEEE, https://ieeexplore.ieee.org/document/9607609.

(Continued)

*Primary Examiner* — Girumsew Wendmagegn
(74) *Attorney, Agent, or Firm* — FINNEGAN, HENDERSON, FARABOW, GARRETT & DUNNER LLP

(57) ABSTRACT

Technical challenge in unusual human activity detection task is to rightly identify only unexpected or unusual movements from constant regular movements present in a scene, with most techniques built on understanding that camera is static. However, ego view camera of mobile surveillance robot is in motion as robot navigates. Embodiments herein provide a method and system for anomalous activity detection for mobile surveillance robots by mimicking 'Konio-Parvocellular-Magno' cells of the human brain into a NN model, which are responsible for detecting slow, normal, and swift changes in perceived scenes. To detect anomalous activity, the static or normal movements of scene captured by ego view camera are identified as redundant information and only RoI is forwarded for further processing using the Optical flow and SSIM techniques. The NN model mimicking KPM is trained only on the RoI to detect normal or anomalous activity.

20 Claims, 11 Drawing Sheets

(51) Int. Cl.
  *G06V 10/75* (2022.01)
  *G06V 10/82* (2022.01)
  *G06V 20/40* (2022.01)
  *G06V 20/56* (2022.01)
  *G06V 40/20* (2022.01)

(52) U.S. Cl.
  CPC .............. *G06V 20/46* (2022.01); *G06V 20/56* (2022.01); *G06V 40/20* (2022.01)

(56) References Cited

OTHER PUBLICATIONS

Fath U Min Ullah et al., Violence Detection Using Spatiotemporal Features with 3D Convolutional Neural Network, Sensors 2019, Apr. 1, 2019, vol. issue Nos. 19 (11), MDPI, https://www.mdpi.com/1424-8220/19/11/2472.

Nida Rasheed et al., Tracking and Abnormal Behavior Detection in Video Surveillance Using Optical Flow and Neural Networks, 2014 28th International Conference on Advanced Information Networking and Applications Workshops, May 13-16, 2014, IEEE, file:///C:/Users/170921/Documents/Trackers/2023-2024-Filings/FF/Docket/IDF-330026-056/IDF-330026-065-NPL%203.pdf.

* cited by examiner (x=36, y=170) ~ R:52 G:52 B:52

(x-=36, y=170) ~ R:52 G:52 B:52

ANOMALOUS ACTIVITY DETECTION FOR MOBILE SURVEILLANCE ROBOTS

PRIORITY CLAIM

This U.S. patent application claims priority under 35 U.S.C. § 119 to: Indian Patent Application No. 202221068018, filed on 25 Nov. 2022. The entire contents of the aforementioned application are incorporated herein by reference.

TECHNICAL FIELD

The embodiments herein generally relate to the field of surveillance systems and, more particularly, to a method and system for anomalous activity detection for mobile surveillance robots.

BACKGROUND

With the recent advances in robotics and deep learning, surveillance robots have increasingly become relevant as a solution offering for large facilities like airports, parks, campus, factories, office, etc. The cost of installing huge number of closed-circuit television (CCTV) cameras for securing large spaces is high, both in terms of installation and maintenance; and there is always a chance of missing some important view angles as CCTV camera have static positioning. Further, there always is scope of manual camera connectivity tampering. In contrast, surveillance robots, similar to a human security, can serve as trustworthy autonomous agents, with more dynamic range of area coverage. A mobile surveillance robot's task is to patrol a pre-specified area to ensure the space's security, and report to an administration stakeholder or an authority if any anomaly (unusual pattern) is perceived by its onboard sensors such as ego view camera. This anomaly detection task helps prevent varied crimes and enables authorities to react quickly to unpleasant situations. Among various types of anomalies possible, unusual human activity detection is a key sub-task of a surveillance robot. The technical challenge in unusual human activity detection task is to rightly identify only unexpected or unusual movements from constant regular movements present in a scene, as the ego view of mobile surveillance robot itself is non-static with constant movement and further captures all meaningful movements as the robot navigates. In state of the art systems, camera is mostly static, moreover majority of the algorithms for anomalous activity detection are developed keeping a static camera in mind, which is not directly applicable in case of mobile surveillance devices such as robots, drones. Prior work has focused on detecting anomalies using auto-encoders, unsupervised learning-based neural nets, one-class classification etc. However, in prior work, the datasets used are synthetically generated, having low train-test accuracy, prone to overfitting, lacks real world testing, and are mostly heuristic-based.

SUMMARY

Embodiments of the present disclosure present technological improvements as solutions to one or more of the above-mentioned technical problems recognized by the inventors in conventional systems.

For example, in one embodiment, a method for anomalous activity detection for mobile surveillance robots is provided. The method includes selecting a set of frames from among a plurality of frames continually captured by an ego view camera, wherein Field of View of the ego view camera changes dynamically during navigation, and wherein the set of frames lie within a single pre-defined time step. Further, the method includes estimating a motion present across a plurality of pixels of each of the set of frames by processing the set of frames based on a hybrid approach comprising (i) fuzzy sets, (ii) random consensus and scene change detection, and (iii) an optical flow computed across the set of frames. Further, the method includes obtaining a net change in each frame at pixel level to segregate static pixels and a Region of Interest (RoI) in each of the sequence of frames by computing Structural Similarity Index Measure (SSIM) between the initial frame and each of the set of frames, wherein the RoI represents pixels associated with the motion of a moving object. Furthermore, the method includes masking the static pixels in each of the sequence of frames to generate a masked sequence of frames comprising the RoI. Furthermore, the method includes processing (i) the RoI of each of the masked sequence of frames, and (ii) associated estimated motion for the set of frames to predict presence of one of (i) an anomalous activity and (ii) a normal activity across the sequence of frames. The processing comprising: (a) feeding (i) the RoI of each of the masked sequence of frames through a first sequence of Convolutional Long short-term memory (ConvLSTM) layers to obtain a first initial feature map of the RoI, and (ii) the associated estimated motion for the set of frames through a second sequence of ConvLSTM layers to obtain a second initial feature map of the estimated motion, for memorizing changes present in the motion of the moving object; (b) feeding (i) the first initial feature map to a first convolution three dimensional (3D) network, and (ii) the second initial feature map to a second convolution 3D network as input, wherein each of the first convolution 3D network and the second convolution 3D network is a parallel pathway structure resembling Konio-Parvocellular-Magno (KPM) cells of a human brain that utilizes varying strides for processing an input with varying frame rate for generating an intermediate level feature map, wherein the varying frame rates and strides are learnt using grid search, while maintaining a hierarchy as a ratio of the lower stride/frame rate number to higher stride/frame rate; (c) concatenating the intermediate level feature map generated by each of the first convolution 3D network and the second convolution 3D network and generating a final feature map by concatenating the intermediate level feature map with a fully connected layer to predict an output as one of the anomalous activity and the normal activity associated with ROI in the set of frames.

In another aspect, a system for anomalous activity detection for mobile surveillance robots is provided. The system comprises a memory storing instructions; one or more Input/Output (I/O) interfaces; and one or more hardware processors coupled to the memory via the one or more I/O interfaces, wherein the one or more hardware processors are configured by the instructions to select a set of frames from among a plurality of frames continually captured by an ego view camera, wherein Field of View of the ego view camera changes dynamically during navigation, and wherein the set of frames lie within a single pre-defined time step. Further, the one or more processors are configured to estimate a motion present across a plurality of pixels of each of the set of frames by processing the set of frames based on a hybrid approach comprising (i) fuzzy sets, (ii) random consensus and scene change detection, and (iii) an optical flow computed across the set of frames. Further, the one or more processors are configured to obtain a net change in each frame at pixel level to segregate static pixels and a Region of Interest (RoI) in each of the sequence of frames by computing Structural Similarity Index Measure (SSIM) between the initial frame and each of the set of frames, wherein the RoI represents pixels associated with the motion of a moving object. Furthermore, the one or more processors are configured to mask the static pixels in each of the sequence of frames to generate a masked sequence of frames comprising the RoI. Furthermore, the one or more processors are configured to process (i) the RoI of each of the masked sequence of frames, and (ii) associated estimated motion for the set of frames to predict presence of one of (i) an anomalous activity and (ii) a normal activity across the sequence of frames. The processing comprising: (a) feeding (i) the RoI of each of the masked sequence of frames through a first sequence of Convolutional Long short-term memory (ConvLSTM) layers to obtain a first initial feature map of the RoI, and (ii) the associated estimated motion for the set of frames through a second sequence of ConvLSTM layers to obtain a second initial feature map of the estimated motion, for memorizing changes present in the motion of the moving object; (b) feeding (i) the first initial feature map to a first convolution three dimensional (3D) network, and (ii) the second initial feature map to a second convolution 3D network as input, wherein each of the first convolution 3D network and the second convolution 3D network is a parallel pathway structure resembling Konio-Parvocellular-Magno (KPM) cells of a human brain that utilizes varying strides for processing an input with varying frame rate for generating an intermediate level feature map, wherein the varying frame rates and strides are learnt using grid search, while maintaining a hierarchy as a ratio of the lower stride/frame rate number to higher stride/frame rate; (c) concatenating the intermediate level feature map generated by each of the first convolution 3D network and the second convolution 3D network and generating a final feature map by concatenating the intermediate level feature map with a fully connected layer to predict an output as one of the anomalous activity and the normal activity associated with ROI in the set of frames.

In yet another aspect, there are provided one or more non-transitory machine-readable information storage mediums comprising one or more instructions, which when executed by one or more hardware processors causes a method for anomalous activity detection for mobile surveillance robots.

The method includes selecting a set of frames from among a plurality of frames continually captured by an ego view camera, wherein Field of View of the ego view camera changes dynamically during navigation, and wherein the set of frames lie within a single pre-defined time step. Further, the method includes estimating a motion present across a plurality of pixels of each of the set of frames by processing the set of frames based on a hybrid approach comprising (i) fuzzy sets, (ii) random consensus and scene change detection, and (iii) an optical flow computed across the set of frames. Further, the method includes obtaining a net change in each frame at pixel level to segregate static pixels and a Region of Interest (RoI) in each of the sequence of frames by computing Structural Similarity Index Measure (SSIM) between the initial frame and each of the set of frames, wherein the RoI represents pixels associated with the motion of a moving object. Furthermore, the method includes masking the static pixels in each of the sequence of frames to generate a masked sequence of frames comprising the RoI. Furthermore, the method includes processing (i) the RoI of each of the masked sequence of frames, and (ii) associated estimated motion for the set of frames to predict presence of one of (i) an anomalous activity and (ii) a normal activity across the sequence of frames. The processing comprising: (a) feeding (i) the RoI of each of the masked sequence of frames through a first sequence of Convolutional Long short-term memory (ConvLSTM) layers to obtain a first initial feature map of the RoI, and (ii) the associated estimated motion for the set of frames through a second sequence of ConvLSTM layers to obtain a second initial feature map of the estimated motion, for memorizing changes present in the motion of the moving object; (b) feeding (i) the first initial feature map to a first convolution three dimensional (3D) network, and (ii) the second initial feature map to a second convolution 3D network as input, wherein each of the first convolution 3D network and the second convolution 3D network is a parallel pathway structure resembling Konio-Parvocellular-Magno (KPM) cells of a human brain that utilizes varying strides for processing an input with varying frame rate for generating an intermediate level feature map, wherein the varying frame rates and strides are learnt using grid search, while maintaining a hierarchy as a ratio of the lower stride/frame rate number to higher stride/frame rate; (c) concatenating the intermediate level feature map generated by each of the first convolution 3D network and the second convolution 3D network and generating a final feature map by concatenating the intermediate level feature map with a fully connected layer to predict an output as one of the anomalous activity and the normal activity associated with ROI in the set of frames.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
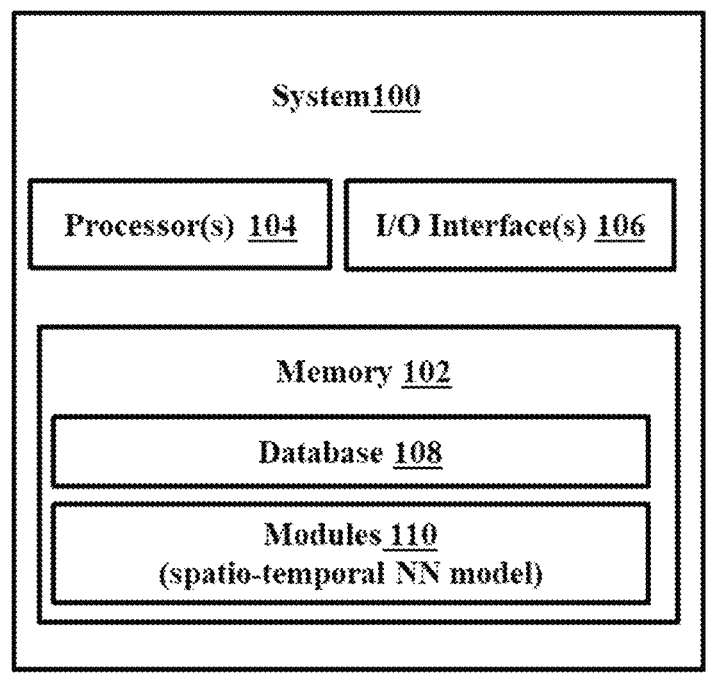
FIG. 1 is a functional block diagram of a system for anomalous activity detection for mobile surveillance robots, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The technical challenge in unusual human activity detection task is to rightly identify only unexpected or unusual movements as against regular, natural and expected movements present in a scene. Furthermore, state of the art surveillance systems for unusual activity detection are based on static camera, thus majority of the existing techniques for anomalous activity detection are developed with assumption of static camera. Thus, the existing anomalous activity detection techniques are not directly applicable in case of mobile surveillance devices such as robots, drones, where a camera in constantly on move to capture all surrounding movements in an environment and then detect only meaningful movements ignoring the regular or expected movements. One of the works in art presents the idea of an auto-encoder being intentionally made to overfit the normal activities class but had a drawback of classifying even slightly unseen normal activities as abnormal. Another exiting approach uses thermal image processing and point cloud analysis for anomaly detection, however, cater to specific anomaly types and need relevant and often costly sensors for implementation. Another Kalman filter and clustering based approach detects outliers but fails to generalize well to crowdy scenarios. Another work attempts to use combination of (a) fast modules to detect co-ordinate pairs in image (b) slow modules to detect neighboring region anomalies, however its performance in activity of interest detection is low. Another existing method uses an auto-encoder to minimize the reconstruction error; and while testing if that error was above a threshold value, an anomaly was said to be present; however, the work heavily depended on the threshold parameter and is not generalizable to a varied class of anomalies.

To overcome the aforementioned limitations, embodiments of the present disclosure provide a method and system for anomalous activity detection for mobile devices such as mobile surveillance robots. The activity detection specifically refers to an unusual human activity such as a violent human activity. The system discloses a spatio-temporal neural network (NN) architecture that mimics the Konio-Parvocellular-Magno (KPM) cells of the human brain, which are responsible for detecting slow, normal, and swift changes in perceived scenes. To detect anomalous activity (unusual human activity), the static (non-moving) or the background steady motion in a scene captured by an ego view camera of a mobile device is identified as redundant information and ignored for further processing. This is achieved by using known Structural Similarity Index Measure (SSIM) technique to identify only a region of interest (RoI) associated with moving object associated with unusual motion. A spatio-temporal neural network NN model mimicking the 'Konio-Parvocellular-Magno' cells is then trained only on the RoI. An abnormal change or the unusual human activity in a scene is detected using a known in the art Farneback algorithm that identifies change in the optical flow of the intensities in different frames.

Referring now to the drawings, and more particularly to FIGS. 1 through 5C, where similar reference characters denote corresponding features consistently throughout the figures, there are shown preferred embodiments and these embodiments are described in the context of the following exemplary system and/or method.

FIG. 1 is a functional block diagram of a system 100 for anomalous activity detection for mobile surveillance robots, in accordance with some embodiments of the present disclosure. In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including mobile devices such as mobile surveillance robots, laptop computers, notebooks, hand-held devices or even if required in workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the memory 102 includes a plurality of modules 110 such as the spatio-temporal NN model (as depicted in FIG. 3 that mimics the 'Konio-Parvocellular-Magno cells, interchangeably referred to as KPM cells, of the human brain) and the like. Further, the plurality of modules 110 include programs or coded instructions that supplement applications or functions performed by the system 100 for executing different steps involved in the process of anomalous activity detection, being performed by the system 100. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 can include various sub-modules (not shown).

Further, the memory 102 may comprise information pertaining to input(s)/output(s) of each step performed by the processor(s) 104 of the system 100 and methods of the present disclosure. Further, the memory 102 includes a database 108. The database (or repository) 108 may include a plurality of abstracted piece of code for refinement and data that is processed, received, or generated as a result of the execution of the plurality of modules in the module(s) 110, for example, video frames captured by ego view of a camera mounted on the system 100 (mobile surveillance robot), intermediate processed frames comprising the RoI and the like.

Although the database 108 is shown internal to the system 100, it will be noted that, in alternate embodiments, the database 108 can also be implemented external to the system 100, and communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to steps in flow diagrams in FIG. 2 through FIG. 5.

Figure 2A:
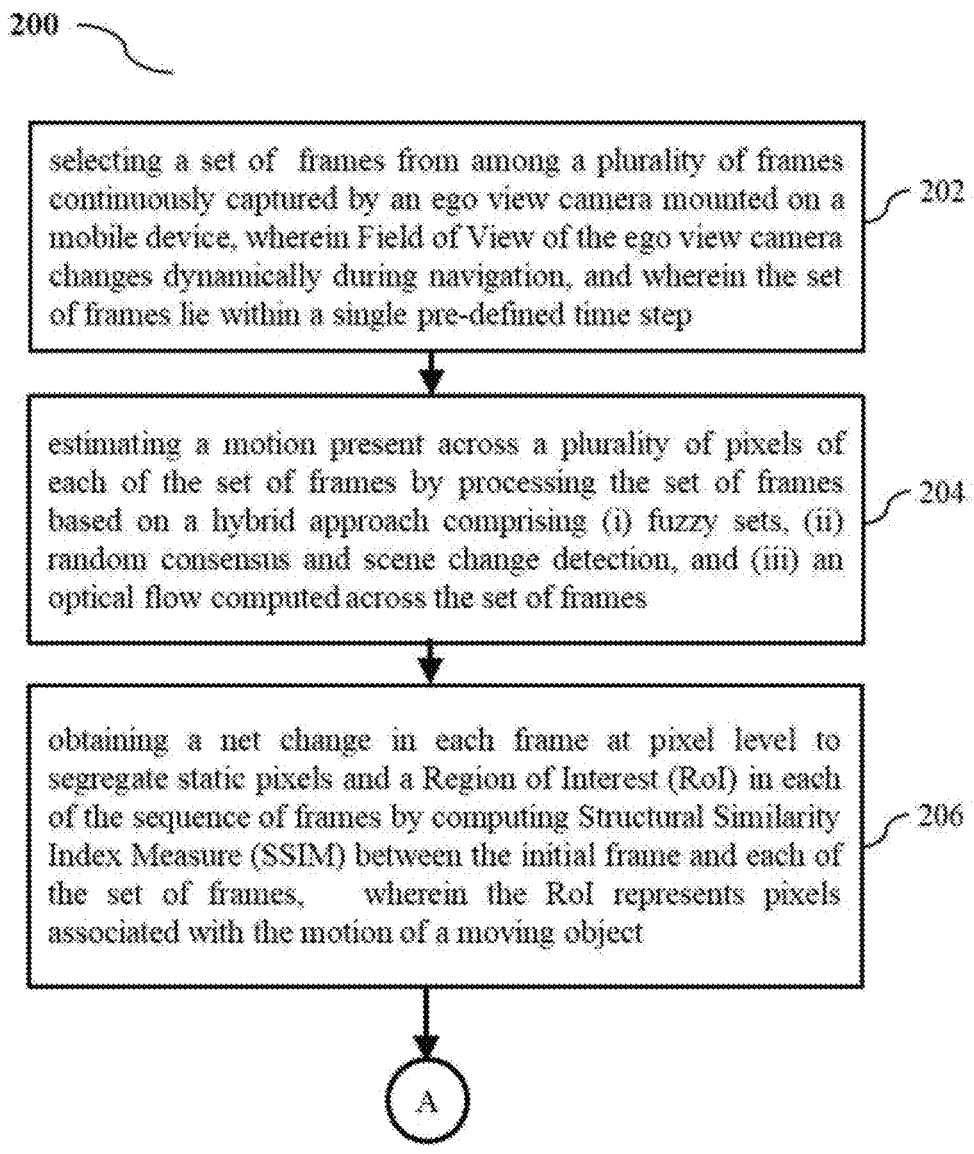
FIGS. 2A through 2B (collectively referred as FIG. 2) is a flow diagram illustrating a method for anomalous activity detection for mobile surveillance robots, using the system of FIG. 1, in accordance with some embodiments of the present disclosure.
Figure 2B:
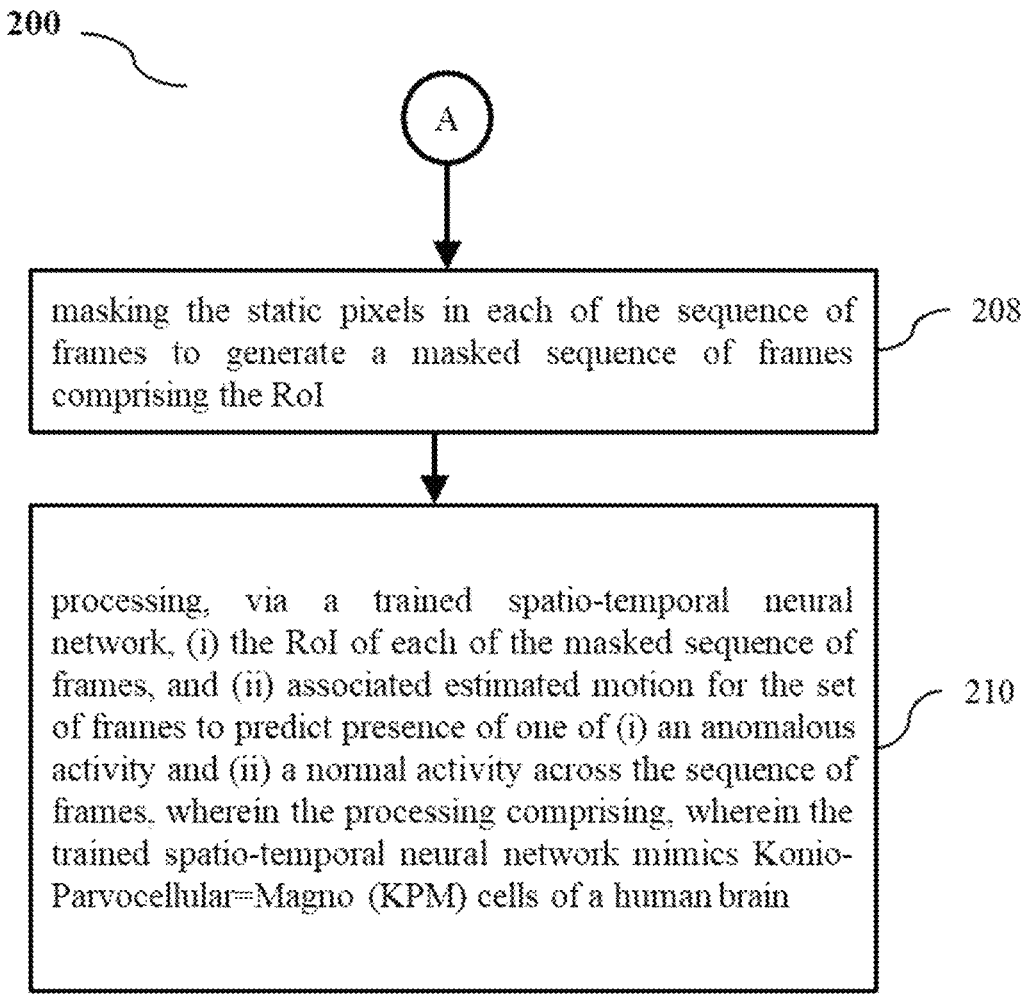

FIGS. 2A through 2B (collectively referred as FIG. 2) is a flow diagram illustrating a method 100 for anomalous activity detection for mobile surveillance robots, using the system of FIG. 1, in accordance with some embodiments of the present disclosure. The method is explained in conjunction with an architectural overview of the system 100 depicted in FIG. 3.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

The method in the steps below utilizes an optical flow frame (OFF) technique known in the art along with the SSIM technique based spatio-temporal neural network depicted in FIG. 3, which can detect if any human unusual human activity such as fighting, violence, shoplifting or the like is happening in indoor scenes.

Referring to the steps of the method 200, at step 202 of the method 200, the one or more hardware processors 104 select a set of frames that lie within a single predefined time step from among a plurality of frames that are continuously captured by an ego view camera mounted on a mobile device (system 100). The set of frames are processed to estimate motion using optical flow approach. For example, herein, the mobile device is the mobile surveillance robot and the single predefined timestep is one second and the set of frames refer to frame rate of the ego view camera, i.e., 20 frames per second, It can be understood that Field of View of the ego view camera changes dynamically during navigation and the captured images do not have a steady scene due to non-static camera motion. It has been observed that many of the previous state-of-the-art methods used the complete frame as an input to detect an anomaly. However, if detecting some abnormal movement in humans activity, and not the regular or steady movement, then most of the non-moving object (or steady movement) in the frame becomes redundant, leading to more computation and probable misclassification. To deal with this technical challenge, the method 200 uses the optical flow of frames (OFF). However, instead of taking all the frames as input, a first frame is fixed, and then with respect to the first frame, the optical flow of the other frames within the predefined timestep (20 frames within a second) is computed. For example, if the first frame has an intensity of I(x, y, t), where (x, y) are the pixel co-ordinates at timestep t, and the $i^{th}$ frame has an intensity of I(x+dx, y+dy, t+dt).

Thus, from the Taylor approximation known in the art, dI/dx δx+dI/dy δy+dI/dx δt=0, as the change in intensity is infinitesimal. Thus, using Taylor approximation, the optical flow between frames is computed. At a single timestep, the system 100 (the mobile device) takes 20 frames (20 fps being the frame rate for the robot ego view camera) as an input, processes the frames to predict presence or absence of anomaly (anomalous activity) by analyzing the spatio-temporal features of the set of frames.

Consider an example, of a bank environment, with day-today banking activities there is present a continuous movement of the crowd. Thus, a steady crowd movement is an expected movement during the normal bank activity. However, a fraudster, robber or an attacker will have an extra swift movement while committing a crime. The mobile surveillance robot is expected to rightly detect the swift movement associated with any abnormal activity, such as a quick and hurried actions of the fraudster. In this scenario, when the OFF and SSIM is calculated at step 204 and 206 respectively for the set of frames (for example, 20 frames in a predefined time step of 1 second), any slow moving object or subject, performing normal activity hardly affects many frames in a 1 second span, but the one who is moving with a faster pace will affect significant number of frames in a predefined timestep (in example herein, span of one second). Once the moving object/subject pixels are identified at pixel level (Region of Interest (RoI)), the spatio-temporal network model further classifies the RoI into normal or anomalous activity using the KPM cell based logic.

The processing is explained with help of steps 204 through 210. Once the set of frames are selected then at step 204 of the method 200, the one or more hardware processors 104 estimate a motion present across a plurality of pixels of each of the set of frames by processing the set of frames based on a hybrid approach comprising (i) fuzzy sets, (ii) random consensus and scene change detection, and (iii) an optical flow computed across the set of frames. When some scene changes happen abruptly, one way is to apply RANSAC (random sample consensus algorithm) to check any outlier as an anomalous movement and then apply iterative closest point (ICP) algorithm to check if between image frames what relatively has changed. In practical scenario, there may be more than one anomaly present. Say there are C classes of anomalies, each having a distinct anomaly category like fighting, fire, theft, gas leak, electric spark, etc., the method instead of only relying on OFF technique, uses a fuzzy membership function that maps the probability of an anomaly to be present in the scene or not present in the scene to a fuzzy membership as P(a)→>F(a). The range of P(a) is within 0 to 1, whereas F(a) maps to fuzzy sets of the C classes with a membership value. When an event is detected in camera as anomaly, it can be a mix of anomalies instead of a distinct one. Based on a majority vote (that can be weighted) among decision models of random consensus, fuzzy and optical flow, final decision of anomaly class (moving object) is taken. The estimated motion is provided as one input to the trained spatio-temporal NN model as explained at step 210 later.

At step 206 of the method 200, the one or more hardware processors 104 compute the Structural Similarity Index Measure (SSIM) between the initial frame (fixed frame) and each of the set of frames based on a covariance to obtain a net change in the frame at pixel level to segregate static pixels and a Region of Interest (RoI) in each of the sequence of frames. The RoI represents pixels associated with the motion of a moving object. The SSIM between the initial frame and $i^{th}$ frame, that provides a net change between the frames is computed using equation 1 known in the art as provided below:

$$SSIM(F_0, F_i) = \frac{(2\mu F_0 \mu F_1 + K_1)(2\sigma F_0 \mu F_1 + K_2)}{(\mu^2 F_0 + \mu^2 F_{1+} K_1)(\sigma^2 F_0 + \sigma^2 F_{1+} K_2)} \quad (1)$$

where $F_0$ is the initial frame, $F_i$ is the $i^{th}$. frame, $\mu_x$ stands for mean, $\sigma_x$ is the variance and $\sigma_{xy}$ is the covariance. By this equation, the changes in the image at the pixel level are obtained. So, the other parts which are not changing are made white colored (or any consistent pattern over frames—to be ignored by model). This processed image is given as an input to the neural network architecture (spatio-temporal NN model) as depicted in FIG. 3A.

At step 208, the one or more hardware processors 104 mask the static pixels (identified using SSIM at step 206) in each of the sequence of frames to generate a masked sequence of frames comprising the RoI. Thus, at step 208 redundant information associated with static pixels is eliminated from further processing.

At step 210, the one or more hardware processors 104 process via the trained spatio-temporal neural network, (i) the RoI of each of the masked sequence of frames, and (ii) associated estimated motion for the set of frames to predict presence of one of (i) the anomalous activity and (ii) the normal activity across the sequence of frames. The spatio-temporal NN model is pretrained on normal activity and anomalous activity scenarios of image sequences. The processing by spatio-temporal NN model the, as depicted in the NN architecture of FIG. 3A and process flow of the system 100 as depicted in FIG. 3B comprises:
  a) Feeding (i) the RoI of each of the masked sequence of frames through a first sequence of Convolutional Long short-term memory (ConvLSTM) layers to obtain a first initial feature map of the RoI, and (ii) the associated estimated motion for the set of frames through a second sequence of ConvLSTM layers to obtain a second initial feature map of the estimated motion, for memorizing changes present in the motion of the moving object.
  b) Feeding (i) the first initial feature map to a first convolution three dimensional (3D) network, and (ii) the second initial feature map to a second convolution 3D network as input, wherein each of the first convolution 3D network and the second convolution 3D network is a parallel pathway structure resembling the Konio-Parvocellular-Magno cells of the human brain that utilizes varying strides for processing an input with varying frame rate for generating an intermediate level feature map. The varying frame rates and strides are learnt using grid search, while maintaining a hierarchy as a ratio of the lower stride/frame rate number to higher stride/frame rate. For a specific task, the apt stride length depends on the domain of application. This can be learned as well by running iterations of anomaly datasets with varying values of the stride lengths to arrive at a conclusion which one works (gives highest sensitivity to desired anomalies) and apply the learnt parameters to similar problem domains. Grid search is a way to represent the changes in values of the parameters along with their results, knowing which combination of values in the grid gives good results for a specific type of anomaly and domain of application.
  c) Concatenating the intermediate level feature map generated by each of the first convolution 3D network and the second convolution 3D network and generating a final feature map by concatenating the intermediate level feature map with a fully connected layer to predict an output as one of the anomalous activity and the normal activity associated with ROI in the set of frames.

Figure 3A:
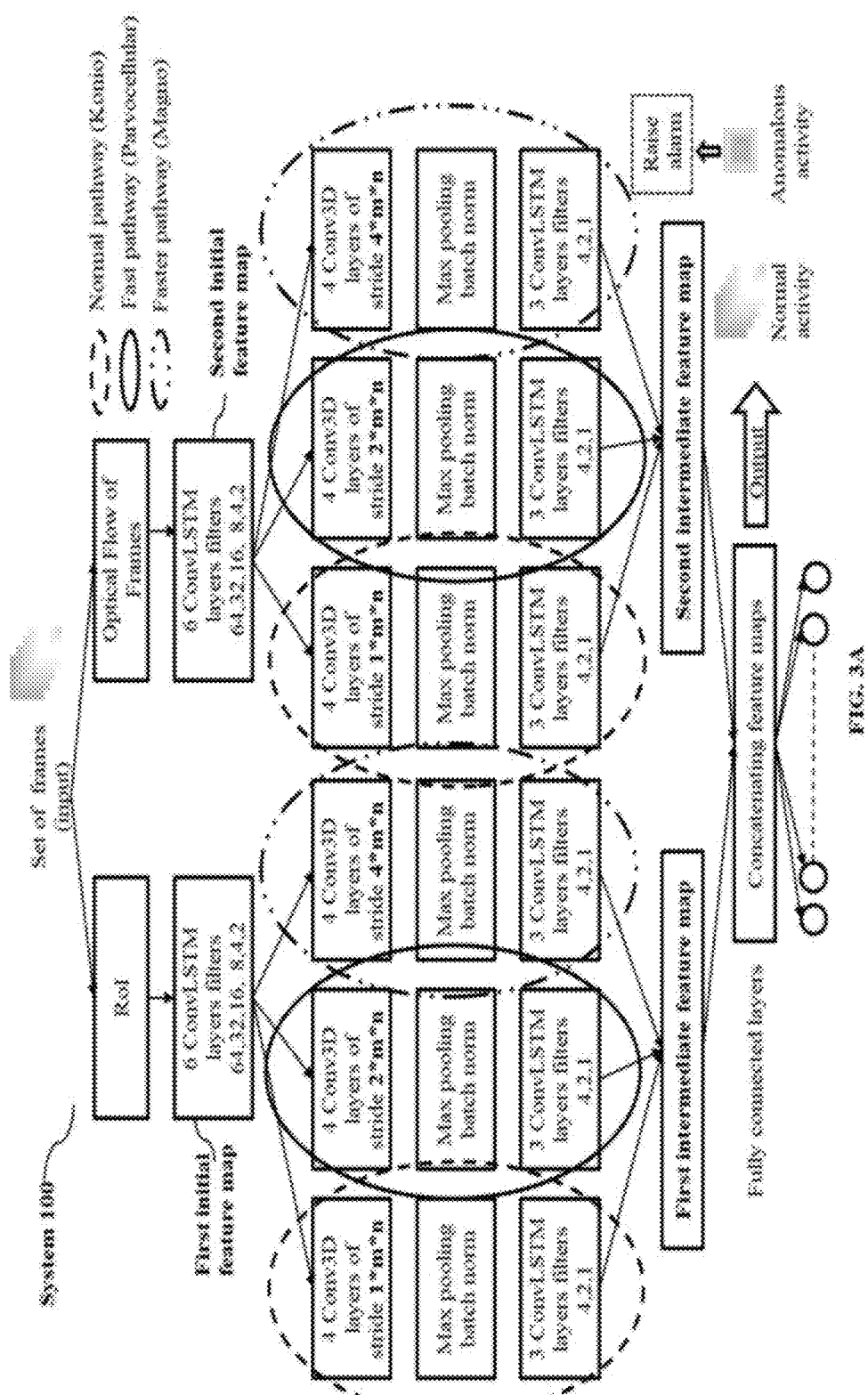
FIG. 3A illustrates an architectural overview of the system of FIG. 1 implementing the method based on spatio-temporal Neural Network (NN) model mimicking, in accordance with some embodiments of the present disclosure.
Figure 3B:
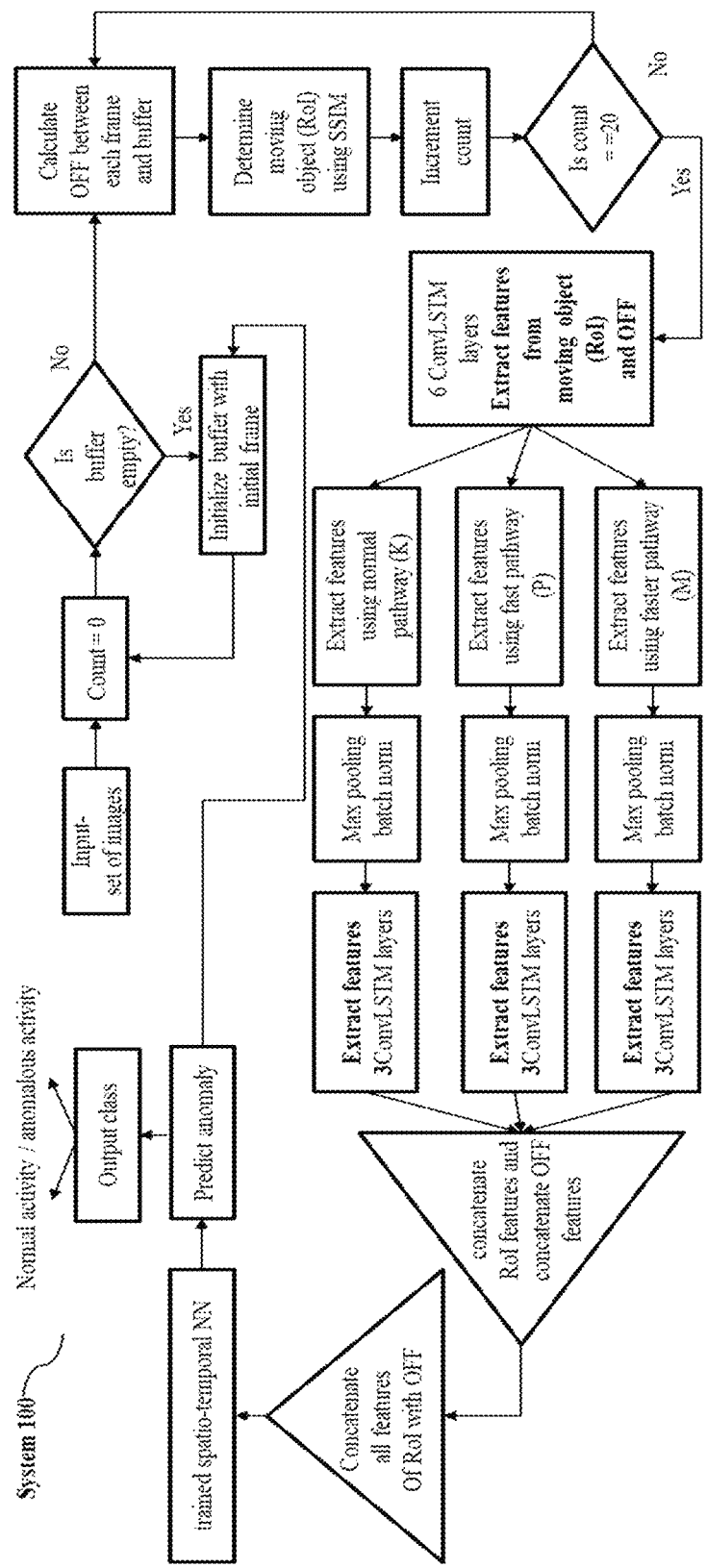
FIG. 3B illustrates the process flow of the system during inferencing stage, in accordance with some embodiments of the present disclosure.

The parallel pathway as depicted in FIG. 3A comprises:
  a) A normal pathway resembling a Koniocellular pathway of Monocellular cells of the human brain and capturing minimal changes across the sequence of frames. This part has a stride, half of the fast pathway and one-fourth of the faster path. Thus, this part of the neural network catches the minimal change in the scene like the koniocellular cells. After getting τ frames, this part of the neural network processes ρ frames at a time. Here, ρ (stride) equals one, set to low value as compared to other two pathways. Thus, it records the minimal change in the frame-to-frame transition.
  b) A fast pathway resembling a Parvocellular pathway of Parvocellular cells of the human brain and structure capturing fast changes across the sequence of frames. The parvocellular cells of the human brain can detect slow and sustained changes. The stride of the fast pathway is (α*ρ) (here it is two set at medium value as compared to other two pathways), which is α times the normal pathway. So, if there is a regular change in human behavior, like moving from one place to another, it detects that. As it processes (α*ρ) frames at a time, it can see the changes, which is fast but not rapid.
  c) A faster pathway resembling a Magnocellular pathway of Magnocellular cells of the human brain and capturing rapid changes across the sequence of frames. The faster pathway imitates the magnocellular cells of the human brain, which are responsible for detecting swift changes in perception. This part of the neural network processes the spatiotemporal features of (β*α*ρ) frames at a time (β being the multiplier, here stride is four set at high value as compared to other pathways). So, if there are any swift changes in a scene, it can handle that change.

In an embodiment, the number parallel pathways or levels can be more than three, or the stride levels high-medium-low can be divided into sub-levels as per model performance and domain of application. As an example, when detecting movement of animals in zoos or parks, each animal will have varying speed of motion and to detect any unusual pattern of a specific animal, it is required to have more than 3 specific pathways of data processing. This is because an animal in sleep will show no movement—so any external small movement need to be alerted to administration. Whereas, when the animal is playing with inhabitant animals, or is eating food or gazing at visitors or seeing a zookeeper or trainer, the scene processing rates need to be dependent on context and the variety of discrete categories of anomalies possible in the application area. This comes in handy when the camera is not static and moving around in form of a drone or flexible motion capable robot to get better glimpses of animals, who might be hidden behind static cameras.

The method 200 repeats steps 202 to 210 for successive set of frames captured by the ego view camera to continuously predict output as one of the anomalous activity and the normal activity associated with the set of frames under consideration as depicted in FIG. 3B. An alert is generated by the system 100 on detection of anomalous activity. Accordingly, a notification can be sent to an administrator, central controller, all stake holders on personal devices or public alert system for users as required by end application using the system 100 for anomalous activity detection.

Explained below is the KPM cell approach concept applied to NN to implement the spatio-temporal NN model that mimics the KPM cells of human brain:

Considering F frames per second, where F0 be the initial frame and Fn be the last frame. Consider a Convolution volume where the frames are passed through. Typically, in one example scenario, the depth of convolution is up to 512 layers. So, each timestamp has 512 layers after incremental operation. For shape of each layer 'S*S' for each timestamp, the whole S*S shape is flattened to provide a vector of elements S*S. Each timestamp has 512 layers. If the time stamps are changed in order, for $i^{th}$ element, a tensor is obtained, which can be considered as a timestamp matrix Gi. Intuitively, it can be viewed as the length of the projected vector a on vector b times the length of vector b. Now, dot product of a and b is a.b=|a| |b|cos(θ), where |a|cos(θ) is the length of the projection. It can be concluded that dot product is the representation of similarity between two vectors. As cos(θ) approaches 1, they become more and more similar.

Now, considering Gi, which is representation of the features in space. Gi is the timestamp matrix of $i^{th}$ layer and Gi−1 is the time stamp matrix of i−$1^{th}$ layer. If dot products are taken of any two vectors in Gi−1 and Gi, it can be derived that the lesser the value is, the lesser two features co-occur. Thus, fixed is the initial time-stamp matrix which is G0. The left hand side of the image is G0 and the right hand side is GiT. Now if these two are multiplied, dot products and co occurance of the features are obtained with respect to each other. This output is referred as timestamp mapping (Tij). Tij means time stamp mapping of Gi and Gj. If G is linearly independent it will produce a Gram matrix inferring that no movement has happened in the environment—so there is no anomaly. a threshold value depending on the domain factors also can be defined.

Now, in conjunction the example time step of 1 second, with frame rate of 20, assumed is n+1=20. The first frame is be taken to calculate G0. With respect to G0 the timestamp mapping of the rest is calculated. So, in this case 19 timestamp mapping (T01, T02, T03, . . . T0n) are obtained, which is considered as and similarly the timestamp mapping of the rest is computed. Thus, 18 timestamp mapping (T12, T13, T14, . . . T1n) and so on. Thus, it can be seen that each of this neuron's distribution of any column (for example at $i^{th}$ column) is the projection of the features of previous timestamps.

Now, a new type of distribution known as timestamp distribution is defined by the method, which helps to replicate the KPM cell of human brain in an analogous sense. Konio cells helps to detect slow change and have multiple inputs, Parvo cells have less input and helps to detect fast changes and Magno cells helps to detect faster changes. So, at $i^{th}$ column, a weighted distribution of each neuron is taken so that it can conclude by analyzing all the frame changes. Next considered is the distribution of the frames in middle. So, if the changes are a bit swift, these frames are affected more and the number of inputs are also less when compared to K cells. And for Magno cell analogy, the changes at the initial frames and at the end frames are considered. This has very less input and can detect swift changes.

Experimental results and deployment: Experiments are done on Video Fight Detection Dataset of Kaggle (Kaushik 2020), containing videos of 100 fights and 101 normal situations (2 classes). Used are 190 videos from training and ten videos for testing. On training the spatio-temporal NN model of FIG. 3 for 10 epochs, a training accuracy of 95.06% and a testing accuracy of 75% percent is obtained. The hyperparameter settings are Learning Rate: 0.0001; Loss Function: Sparse Categorical Cross-entropy; Optimizer: Adam; Dropout: 0.25.

TABLE 1

|  | Predicted Yes | Predicted No |
|---|---|---|
| Actual Yes | 49 | 20 |
| Actual No | 17 | 54 |

TABLE 2

| Class Score | Precision | Recall | F1 |
|---|---|---|---|
| 0 | 0.74 | 0.71 | 0.73 |
| 1 | 0.73 | 0.76 | 0.74 |

TABLE 3

| Epoch | 1 | 2 | 3 | 4 | 5 | 6 | 7 | 8 | 9 | 10 |
|---|---|---|---|---|---|---|---|---|---|---|
| Train Loss | 0.69, | 0.69, | 0.68, | 0.67, | 0.65, | 0.63, | 0.62, | 0.60, | 0.58, | 0.57 |
| Train Accuracy | 0.53, | 0.54, | 0.54, | 0.59, | 0.66, | 0.64, | 0.66, | 0.68, | 0.69, | 0.70 |
| Test Loss | 0.70, | 0.70, | 0.70, | 0.65, | 0.65, | 0.62, | 0.65, | 0.65, | 0.65, | 0.65 |
| Test Accuracy | 0.47, | 0.47, | 0.47, | 0.68, | 0.60, | 0.66, | 0.59, | 0.66, | 0.64, | 0.64 |

TABLE 4

| Method | Accuracy | Recall | Precision | F1 Score |
|---|---|---|---|---|
| ViViT | 0.69 | 0.95 | 0.61 | 0.73 |
| CNN-RNN | 0.78 | 1.0 | 0.60 | 0.75 |

TABLE 5

| Epoch | 1 | 2 | 3 | 4 | 5 | 6 | 7 | 8 | 9 | 10 |
|---|---|---|---|---|---|---|---|---|---|---|
| Train Loss | 0.68, | 0.61, | 0.57, | 0.54, | 0.52, | 0.50, | 0.45, | 0.42, | 0.36, | 0.31 |
| Train Accuracy | 0.55, | 0.69, | 0.71, | 0.72, | 0.74, | 0.74, | 0.79, | 0.81, | 0.83, | 0.86 |
| Test Loss 0.63 | 0.63, | 0.54, | 0.58, | 0.50, | 0.47, | 0.51, | 0.51, | 0.52, | 0.49, | 0.53 |
| Test Accuracy | 0.71, | 0.73, | 0.71, | 0.75, | 0.76, | 0.75, | 0.76, | 0.79, | 0.74, | 0.74 |

Table 5 describes the training and testing, accuracies of the model per epoch, averaged over cross validation. Table 2 shows the precision, recall and accuracy scores. Table 1 represents the confusion matrix. To prove that SSIM and Optical flow frames produces superior result, shown are results on the entire image frame. Table 3 shows the accuracy and loss for this case which is lower. The method 200 is compared with state of the art Video Vision Transformer (ViViT) by Aritra Roy Gosthipaty 2022 et. al and Convolution Neural Networks-Recurrent Neural Networks (CNN-RNN) by Paul 2021, and the results of are as enlisted in Table 4. It is seen that the method 200 with the spatio-temporal NN model achieved better results in terms of precision and F1 Score and also have obtained better accuracy than ViViT and almost similar accuracy as CNN-RNN's best reported accuracy.

Deployment in mobile surveillance robot: The method 200 is implemented in a Double31™ robot over a custom built software layer in office campus settings, with onboard camera having frame capture rate of 20 fps. By creating situations of conflict (based on hand gestures and body movements), we have verified the anomaly prediction to be correct most of the time. The major observations are: (i) if the input frame rate is low, the model does not work well for rapid activities; (ii) frame losses can be expected due to (a) compute time of the incoming frames and (b) network connectivity glitches; (iii) frames captured in dim light conditions leads to more false alarms; (iv) robot's positioning at an optimal camera view angle leads to better accuracy.

Figure 4A:
FIGS. 4A, 4B, and 4C (collectively referred as FIG. 4) and FIGS. 5A, 5B, and 5C (collectively referred as FIG. 5) depict image analysis of a video, performed by the mobile surveillance robot, to predict normal activity and anomalous activity respectively during inferencing phase using the system of FIG. 3B, in accordance with some embodiments of the present disclosure.
Figure 4B:
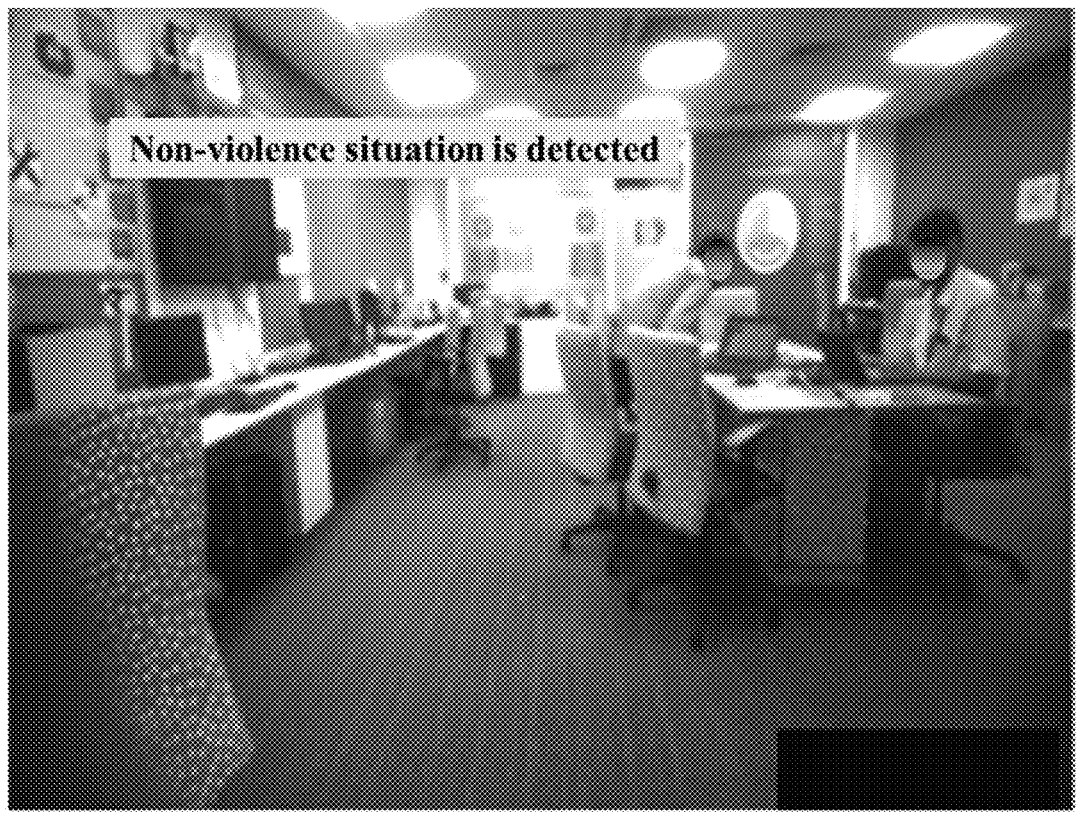
Figure 4C:
Figure 5A:
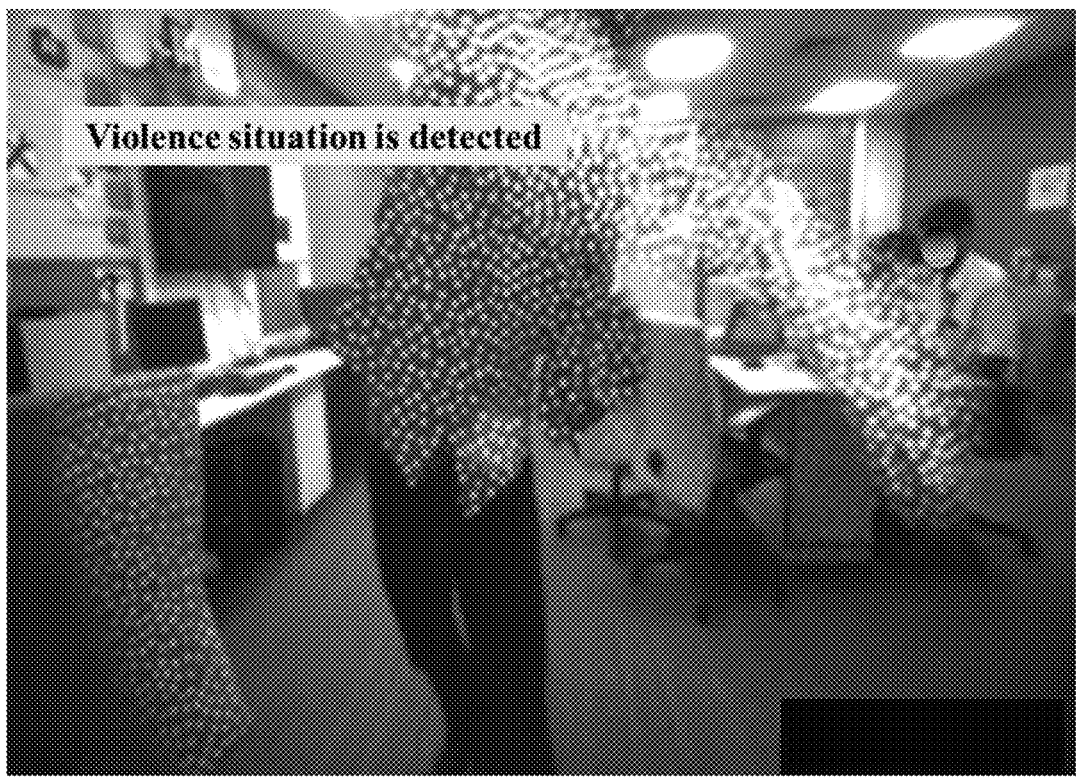
Figure 5B:
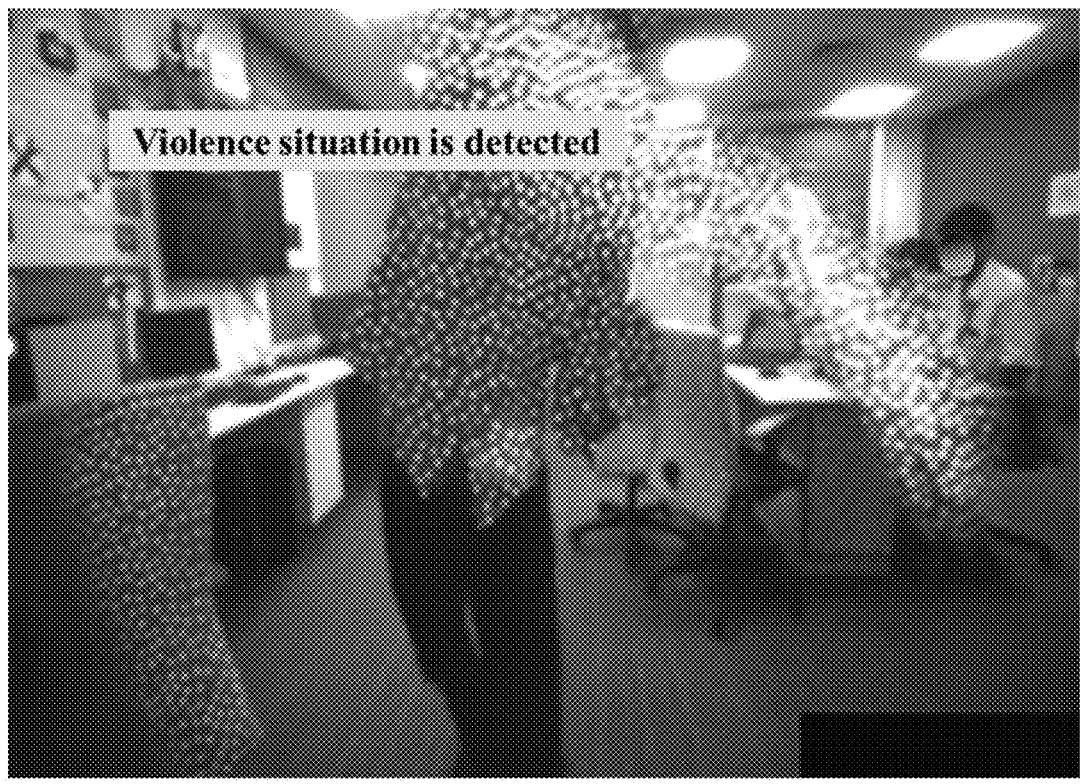
Figure 5C:
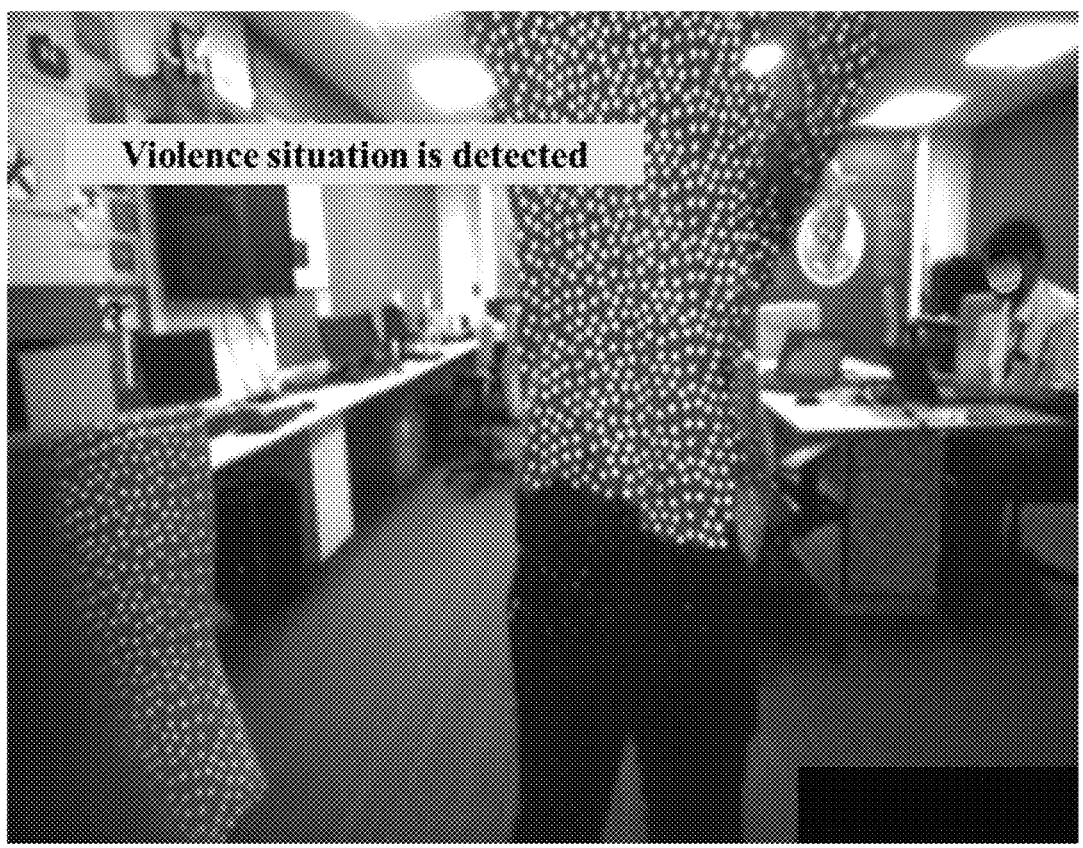

FIGS. 4A through 4C (collectively referred as FIG. 4) and FIGS. 5A through 5C (collectively referred as FIG. 5) depict image analysis of a video, performed by the mobile surveillance robot, to predict normal activity and anomalous activity respectively using the system of FIG. 3, in accordance with some embodiments of the present disclosure. For the use case herein the model spatio-temporal NN model was trained on "fight or not-fight" dataset. Where fight means abusing, beating or its variations in real time scenario. In the FIGS. 4 and 5, a simulated fight scene was considered where subject creates an artificial fighting scenes with movement of hands and legs, which is unusual compared to normal flow of events in front of camera (like walking or sitting person). The method 200 based on the spatio-temporal NN model analyzes the input video frames according to the inferencing phase process flow depicted in FIG. 3B to predict the anomaly class. As depicted in FIG. 4, frames captured by an ego camera of a mobile surveillance robot capture normal movements such as sitting action and staff working at table, which are not identified by the system 100 to have anomalous activity, However, FIG. 5, the ego view camera captures heavy movement, which is detected as anomalous activity by the method 200 implemented by the system 100.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for anomalous activity detection, the method comprising:

selecting, via one or more hardware processors, a set of frames from among a plurality of frames continually captured by an ego view camera, wherein Field of View of the ego view camera changes dynamically during navigation, and wherein the set of frames lie within a single pre-defined time step;

estimating, via the one or more hardware processors, a motion present across a plurality of pixels of each of the set of frames by processing the set of frames based on a hybrid approach comprising (i) fuzzy sets, (ii) random consensus and scene change detection, and (iii) an optical flow computed across the set of frames;

obtaining, via the one or more hardware processors, a net change in each frame at pixel level to segregate static pixels and a Region of Interest (RoI) in each of the sequence of frames by computing Structural Similarity Index Measure (SSIM) between the initial frame and each of the set of frames, wherein the RoI represents pixels associated with the motion of a moving object;

masking, via the one or more hardware processors, the static pixels in each of the sequence of frames to generate a masked sequence of frames comprising the RoI; and processing, via a trained spatio-temporal neural network executed by the one or more hardware processors (i) the RoI of each of the masked sequence of frames, and (ii) associated estimated motion for the set of frames to predict presence of one of (i) an anomalous activity and (ii) a normal activity across the sequence of frames, wherein the processing comprising:

feeding (i) the RoI of each of the masked sequence of frames through a first sequence of Convolutional Long short-term memory (ConvLSTM) layers to obtain a first initial feature map of the RoI, and (ii) the associated estimated motion for the set of frames through a second sequence of ConvLSTM layers to obtain a second initial feature map of the estimated motion, for memorizing changes present in the motion of the moving object;

feeding (i) the first initial feature map to a first convolution three dimensional network, and (ii) the second initial feature map to a second convolution 3D network as input, wherein each of the first convolution 3D network and the second convolution 3D network is a parallel pathway structure resembling Konio-Parvocellular-Magno (KPM) cells of a human brain that utilizes varying strides for processing an input with varying frame rate for generating an intermediate level feature map, wherein the varying frame rates and strides are learnt using grid search, while maintaining a hierarchy as a ratio of the lower stride/frame rate number to higher stride/frame rate; and concatenating the intermediate level feature map generated by each of the first convolution 3D network and the second convolution 3D network and generating a final feature map by concatenating the intermediate level feature map with a fully connected layer to predict an output as one of the anomalous activity and the normal activity associated with ROI in the set of frames.

2. The processor implemented method of claim 1, wherein the parallel pathway comprises:

a normal pathway resembling a Koniocellular pathway of Monocellular cells of the human brain and capturing minimal changes across the sequence of frames, wherein the stride is set to low value as compared to the fast pathway and the fastest pathway;

a fast pathway resembling a Parvocellular pathway of Parvocellular cells of the human brain and structure capturing fast changes across the sequence of frames, wherein the stride is set to medium value as compared to the normal pathway and the fastest pathway; and a faster pathway resembling a Magnocellular pathway of Magnocellular cells of the human brain and capturing rapid changes across the sequence of frames, wherein the stride is set to high value as compared to the normal pathway and the fast pathway.

3. The processor implemented method of claim 2, wherein number of parallel pathways are further divided into sub-levels as per model performance and domain of application.

4. The processor implemented method of claim 1, wherein the anomalous activity is an unusual human activity.

5. The processor implemented method of claim 1, comprises continuing the prediction at the output as one of the anomalous activity and the normal activity associated with ROI for incoming successive set of frames from among the plurality of frames captured by the ego view camera.

6. The processor implemented method of claim 1, wherein the ego view camera is mounted on a mobile surveillance robot.

7. The processor implemented method of claim 1, wherein the trained spatio-temporal NN model is trained on normal activity and anomalous activity scenarios of image sequences.

8. A system for anomalous activity detection, the system comprising:
a memory storing instructions;
one or more Input/Output (I/O) interfaces; and
one or more hardware processors coupled to the memory via the one or more I/O interfaces, wherein the one or more hardware processors are configured by the instructions to:
select a set of frames from among a plurality of frames continually captured by an ego view camera, wherein Field of View of the ego view camera changes dynamically during navigation, and wherein the set of frames lie within a single pre-defined time step;
estimate a motion present across a plurality of pixels of each of the set of frames by processing the set of frames based on a hybrid approach comprising (i) fuzzy sets, (ii) random consensus and scene change detection, and (iii) an optical flow computed across the set of frames;
obtain a net change in each frame at pixel level to segregate static pixels and a Region of Interest (RoI) in each of the sequence of frames by computing Structural Similarity Index Measure (SSIM) between the initial frame and each of the set of frames, wherein the RoI represents pixels associated with the motion of a moving object;
mask the static pixels in each of the sequence of frames to generate a masked sequence of frames comprising the RoI; and
process (i) the RoI of each of the masked sequence of frames, and (ii) associated estimated motion for the set of frames to predict presence of one of (i) an anomalous activity and (ii) a normal activity across the sequence of frames, wherein the processing comprising:
feeding (i) the RoI of each of the masked sequence of frames through a first sequence of Convolutional Long short-term memory (ConvLSTM) layers to obtain a first initial feature map of the RoI, and (ii) the associated estimated motion for the set of frames through a second sequence of ConvLSTM layers to obtain a second initial feature map of the estimated motion, for memorizing changes present in the motion of the moving object;
feeding (i) the first initial feature map to a first convolution three dimensional network, and (ii) the second initial feature map to a second convolution 3D network as input, wherein each of the first convolution 3D network and the second convolution 3D network is a parallel pathway structure resembling Konio-Parvocellular-Magno (KPM) cells of a human brain that utilizes varying strides for processing an input with varying frame rate for generating an intermediate level feature map, wherein the varying frame rates and strides are learnt using grid search, while maintaining a hierarchy as a ratio of the lower stride/frame rate number to higher stride/frame rate; and
concatenating the intermediate level feature map generated by each of the first convolution 3D network and the second convolution 3D network and generating a final feature map by concatenating the intermediate level feature map with a fully connected layer to predict an output as one of the anomalous activity and the normal activity associated with ROI in the set of frames.

9. The system of claim 8, wherein the parallel pathway comprises:
a normal pathway resembling a Koniocellular pathway of Monocellular cells of the human brain and capturing minimal changes across the sequence of frames, wherein the stride is set to low value as compared to the fast pathway and the fastest pathway;
a fast pathway resembling a Parvocellular pathway of Parvocellular cells of the human brain and structure capturing fast changes across the sequence of frames, wherein the stride is set to medium value as compared to the normal pathway and the fastest pathway; and
a faster pathway resembling a Magnocellular pathway of Magnocellular cells of the human brain and capturing rapid changes across the sequence of frames, wherein the stride is set to high value as compared to the normal pathway and the fast pathway.

10. The system of claim 9, wherein number of parallel pathways are further divided into sub-levels as per model performance and domain of application.

11. The system of claim 8, wherein the anomalous activity is an unusual human activity.

12. The system of claim 8, wherein the one or more hardware processors are configured to continue the prediction at the output as one of the anomalous activity and the normal activity associated with ROI for incoming successive set of frames from among the plurality of frames captured by the ego view camera.

13. The system of claim 8, wherein the ego view camera is mounted on a mobile surveillance robot.

14. The system of claim 8, wherein the trained spatio-temporal NN model is trained on normal activity and anomalous activity scenarios of image sequences.

15. One or more non-transitory machine-readable information storage mediums comprising one or more instructions which when executed by one or more hardware processors cause:
selecting, a set of frames from among a plurality of frames continually captured by an ego view camera, wherein Field of View of the ego view camera changes dynamically during navigation, and wherein the set of frames lie within a single pre-defined time step;
estimating, via the one or more hardware processors, a motion present across a plurality of pixels of each of the set of frames by processing the set of frames based on a hybrid approach comprising (i) fuzzy sets, (ii) random consensus and scene change detection, and (iii) an optical flow computed across the set of frames;
obtaining, via the one or more hardware processors, a net change in each frame at pixel level to segregate static pixels and a Region of Interest (RoI) in each of the sequence of frames by computing Structural Similarity Index Measure (SSIM) between the initial frame and each of the set of frames, wherein the RoI represents pixels associated with the motion of a moving object;
masking, via the one or more hardware processors, the static pixels in each of the sequence of frames to generate a masked sequence of frames comprising the RoI; and
processing, via a trained spatio-temporal neural network executed by the one or more hardware processors (i) the RoI of each of the masked sequence of frames, and (ii) associated estimated motion for the set of frames to predict presence of one of (i) an anomalous activity and (ii) a normal activity across the sequence of frames, wherein the processing comprising:

feeding (i) the RoI of each of the masked sequence of frames through a first sequence of Convolutional Long short-term memory (ConvLSTM) layers to obtain a first initial feature map of the RoI, and (ii) the associated estimated motion for the set of frames through a second sequence of ConvLSTM layers to obtain a second initial feature map of the estimated motion, for memorizing changes present in the motion of the moving object;

feeding (i) the first initial feature map to a first convolution three dimensional network, and (ii) the second initial feature map to a second convolution 3D network as input, wherein each of the first convolution 3D network and the second convolution 3D network is a parallel pathway structure resembling Konio-Parvocellular-Magno (KPM) cells of a human brain that utilizes varying strides for processing an input with varying frame rate for generating an intermediate level feature map, wherein the varying frame rates and strides are learnt using grid search, while maintaining a hierarchy as a ratio of the lower stride/frame rate number to higher stride/frame rate; and concatenating the intermediate level feature map generated by each of the first convolution 3D network and the second convolution 3D network and generating a final feature map by concatenating the intermediate level feature map with a fully connected layer to predict an output as one of the anomalous activity and the normal activity associated with ROI in the set of frames.

16. The one or more non-transitory machine-readable information storage mediums of claim 15, wherein the parallel pathway comprises:

a normal pathway resembling a Koniocellular pathway of Monocellular cells of the human brain and capturing minimal changes across the sequence of frames, wherein the stride is set to low value as compared to the fast pathway and the fastest pathway;

a fast pathway resembling a Parvocellular pathway of Parvocellular cells of the human brain and structure capturing fast changes across the sequence of frames, wherein the stride is set to medium value as compared to the normal pathway and the fastest pathway; and a faster pathway resembling a Magnocellular pathway of Magnocellular cells of the human brain and capturing rapid changes across the sequence of frames, wherein the stride is set to high value as compared to the normal pathway and the fast pathway.

17. The one or more non-transitory machine-readable information storage mediums of claim 16, wherein number of parallel pathways are further divided into sub-levels as per model performance and domain of application.

18. The one or more non-transitory machine-readable information storage mediums of claim 15, wherein the anomalous activity is an unusual human activity.

19. The one or more non-transitory machine-readable information storage mediums of claim 15, comprises continuing the prediction at the output as one of the anomalous activity and the normal activity associated with ROI for incoming successive set of frames from among the plurality of frames captured by the ego view camera.

20. The one or more non-transitory machine-readable information storage mediums of claim 15, wherein the ego view camera is mounted on a mobile surveillance robot.

* * * * *